Patented Dec. 28, 1926.

1,612,098

UNITED STATES PATENT OFFICE.

WILLIAM W. CHRISTMAS, OF RIDGEFIELD PARK, NEW JERSEY, ASSIGNOR OF ONE-THIRD TO C. C. HINES, OF WASHINGTON, DISTRICT OF COLUMBIA.

COMMINUTED WOOD PRODUCT AND METHOD OF MAKING THE SAME.

No Drawing. Original application filed February 21, 1923. Serial No. 620,504. Divided and this application filed June 9, 1924. Serial No. 719,005.

My invention relates to a new and improved composition material, using comminuted wood, preferably wood waste, such as sawdust or its equivalent, as a body, and a binder consisting, essentially, of casein glue, combined in such manner as to produce a plastic compound of a novel character and possessing valuable qualities adapting it for use for many and various purposes in the industrial arts in place of natural woods and other substances; and my invention also relates to a method of producing a plastic composition of such character.

The present application is a division of my prior application filed February 21, 1923, Serial No. 620,504, which has eventuated in Patent No. 1,521,174, dated December 30, 1924, for composition material.

One object of the invention is to provide a plastic composition which may be molded, rolled, pressed or otherwise formed into shape to produce a desired article, sheet or surface, which is durable, tough and resilient, which may be sawed, planed, turned or otherwise worked with tools like natural woods, which may be applied by spreading like cement to form floors, panels or like surfaces, which will not warp, check or crack under ordinary temperatures or uses, which is highly water-resistant, and which may be bored, and through which nails or the like may be driven, without splitting or cracking.

Another object of the invention is to provide a plastic composition from which articles or surfaces of natural wood finishes may be made, which may be dyed or colored to represent any wood or be given any ornamental surface finish, in imitation of natural woods, stones or fabrics, which possesses high dielectric and electric insulating properties, which may be surface stained, painted, varnished or enamelled, and which may be easily treated to render it waterproof and also proof against high temperature changes.

Still another object of the invention is to provide a wood-casein glue composition which is superhardened in such manner as to greatly increase its strength, durability and resiliency, while, at the same time, rendering the product of such a uniform and homogeneous texture, that such product may be worked with tools without objectionally-quick dulling or excessive wear and tear upon the tools.

A still further object of the invention is to provide a plastic composition which may be used in place of natural wood for the production of articles or surfaces of greater strength and durability than when made from the natural wood, and which will be substantially fire-proof and adapted to be oven-enamelled when desired.

A still further object of the invention is to provide a method of making a composition possessing the desirable qualities and qualifications specified.

In carrying my invention into practice, I provide a composition consisting, when made from prepared casein glue, of the following constituents:

Casein glue, 1 part; water (preferably distilled), 3 parts; and comminuted wood, 4 to 5 parts.

The prepared casein glue referred to may consist of any of the commercial products in powdered form, consisting of casein, mixed with hydrated powdered lime, using from ten percent (10%) to twenty-five percent (25%) of lime, as may be found most desirable under different conditions. I may, however, mix the lime with the casein at the time the product is to be prepared, and for special purposes may use other and equivalent setting alkalies, and in addition employ other ingredients, such as caustic soda, sodium fluoride, sodium silicate, sodium phosphate, or magnesia, for the purpose of increasing the working life, add water resistance, give antiseptic properties and to otherwise improve the qualities of the glue. The comminuted wood employed may be sawdust, ranging from coarse quality to the degree of fineness of wood flour, according to the fineness of texture and quality of the substance to be produced, and I may use any suitable equivalent of this wood waste material, such as wood fibre, wood pulp, cellulose fibre, or any comminuted wood material made from low grade woods or any wood waste, similar to sawdust, which may be employed for the purpose in original or properly prepared form.

The stated amount of water employed is that adapted for general use, but the amount may vary to a greater or less extent dependent upon the nature of the casein employed.

I, however, use an amount of water slightly in excess of that required to give the requisite degree of viscosity and agglutinating properties suitable for the amount of wood under treatment, this excess amount of water being for a purpose hereinafter described.

In producing the composition where ready prepared glue, as such, is used, the glue is first introduced into the water and thoroughly mixed therewith by stirring or agitation until all the glue is introduced and a smooth flowing mixture of uniform consistency is produced. This water glue mixture is then allowed to stand for a period of from 15 to 20 minutes until a complete chemical action takes place, at which time gelatination of the albuminoid (proteid) constituent is about to begin. The comminuted wood, preferably in a moistened or partially saturated state, is then gradually added to the glue mixture, the mass being constantly stirred or agitated to cause the glue to thoroughly permeate the wood. This is continued until all the wood is introduced and a thorough combination of the constituents is effected and a dough-like mass produced. The composition is then complete and ready for use. Where the glue is prepared at the time of use, the lime, or other setting alkali, alone, or with other alkalies or other modifying constituents employed, is first mixed with a quantity of the water, and the casein with a quantity of the water, and the lime-water and casein-water mixtures then combined and allowed to stand until complete chemical combination takes place, when it is ready for the introduction of the wood constituent thereinto.

The dough-like mass, prepared as above-described, and consisting of wood, without other inert material, and the binder of water-casein-glue, is a workable plastic body capable of being molded, rolled, pressed or otherwise shaped into a desired form, but containing an amount of moisture slightly in excess of that required for agglutination throughout the mass. This excess amount of moisture is held bound in the body and is capable in whole or part, of exudation to the surface of the body, under pressure applied to the body and according to the degree of pressure employed. I make use of this excess moisture, and certain properties which it gives to the material, for the purpose of securing certain beneficial working and treatment results, as fully hereinafter explained.

Articles of various kinds may be made from the plastic composition by molding, with or without pressure. Without pressure, the density of the article made is about equivalent to that of medium-weight natural wood. Under increasing degrees of pressure the density and weight of the product increases, and in the manufacture of dense products pressure of any degree may be resorted to. An important advantage of this composition, however, is that a weight, density and solidity sufficient for all ordinary purposes is secured by plain molding without pressure or with very little pressure. This is due to the fact that in the composition made as described all portions of the wood, including the minute pores of the wood particles, are saturated with the glue, distributed uniformly throughout the mass by the liquidity of the slightly thinned adhesive, owing to the presence of the slight excess of water, so that the formed article will be uniform in density and texture throughout and may be so molded without pressure. The article so produced will set and harden ordinarily in from three to four hours and will naturally dry and harden fully in about one week. The excess of moisture referred to slightly prolongs the setting and hardening periods when the product is allowed to set and dry in a natural way, but lends itself to the carrying out of various important steps in various uses of the material and particularly to artificial drying for mass-production purposes, the manufacture of a super-hardened product, and the rolling or laying of the material by trowels or like tools, as in the construction of sheet-material, floors or similar materials and surfaces. When the article is molded, and is to be given a fine and smooth surface finish without dressing treatment, this may be effected by molding under slight pressure, causing the surplus adhesive to flow to the surface, fill all voids and dry with a glazed finish.

The plastic composition may also be shaped as desired under pressure, as in the manufacture of articles in press molds or between dies, and such composition may also be passed between rolls, with or without pressure, for the production of material in sheet form. Articles varying from pieces of statuary and the like to furniture parts and other objects of utility may be made by ordinary molding or by press-molding, and boards, tiles, panels, channel beams and other articles of sheet or channeled form may be made by a rolling process. The composition may further be laid while plastic to form floor, wall or ceiling surfaces, continuous or blocked, in which operation it is spread like cement by the use of trowels or similar tools. When so laid, the presence of the excess moisture in the composition is of advantage and importance, in that the workmen by tamping or patting the laid material may bring the excess moisture to the top to "float" and smooth off the surface and to enable the material to be worked and smoothed without becoming tacky and sticking to the tools. Exudation of the excess moisture to the surface is also of advantage in smoothing off the face surface of an article formed in a plain mold and in preventing sticking of dies or rolls to the material in other shaping operations without the necessity of coating the surfaces of the formers or shapers with oil or other non-sticking substances, or, if an oil or other coating substance is used, it will enable the amount to be materially reduced. A coating of glue lying at or adjacent to the surface may thus be provided which is useful in allowing tiles or other articles made in accordance with my invention to be strongly joined edge-to-edge by a glue of the same kind used as the binder, the glue so employed combining with the glue in the articles to make a stronger joint.

The proportions of the constituents employed in this composition are of importance for the production of a product having the general properties of medium-weight natural wood, but which is harder, stronger, tougher and more resilient than the natural wood.

The hardened product made from this composition, when made from the waste or fibre of a natural white wood, is denser than the natural wood, of approximately the same or of a somewhat greater weight, and is of a color varying from a light cream to a buff or deep cream, and may be used in this condition for flooring, ceiling, paneling and all other purposes to provide a pleasing and artistic surface. The product prepared for any of these purposes may be molded or shaped with a smooth surface or with a rough or irregular "oatmeal" surface, and may be left untreated to weather or may be stained, varnished or otherwise suitably finished. Such product has its wood particles homogeneously bound in surface contact throughout the mass by the binder and hence is of uniform texture and may be sawed, turned, planed, sand-finished or otherwise shaped or finished without breaking or crumbling and will take a very fine surface finish which may be highly polished. The prepared product is substantially water-proof, being highly resistant to moisture, and when varnished, enamelled or treated with a similar surface coating, will be practically proof against the absorption of moisture. The product may be made water-proof by immersing it in boiling paraffin or similar oils or waxes or a mixture of oils or waxes, or by combining with the plastic composition synthetic or natural resins or rubber, which, in the subsequent course of treating the formed article in the drying process, hereinafter described, will result in the thorough permeation of the material by the water-proof substance or substances and the partial or complete vulcanization of rubber if a rubber compound is used. The natural material has high dielectric and other electric insulating properties and may be used wherever a fibre base or panel is employed for the mounting of electrical instruments and the like.

The product may be made to simulate wood of various kinds and colors by the introduction of dyes or other coloring material into the wood or composition at the time of mixing the constituents thereof. Products varying in shades or colors, and of contrasting colors, may be made by dyeing portions of the sawdust or other wood material different colors and mixing the differently colored woods in varying proportions before the formation of the plastic mass. In this manner coloring agents may be produced to make the prepared product simulate various wood, tapestry or stone finishes. Sheet material so prepared may be made to resemble artistic marble or other materials for the production of ornamental building materials, such as tiles and other similar articles. The surface of the product may further be stained, painted or enamelled in the usual way, with the result of making a more durable finish than usual, as the solvent vehicle and pigment of the coating will in such cases combine to some extent with the proteid binder and thus be prevented from flaking or crumbling off.

While the product may be naturally dried, an important part of my invention consists in a drying step, which reduces the time necessary for making the product ready for the market, and at the same time provides a superhardened product and one which is cured thoroughly against possibility of decomposition of the component parts thereof. In drying the formed product it is placed in a suitable chamber and there subjected to the action of live steam, at a temperature of from 300° to 400° F., this being continued until inspection of the product shows that the interior thereof is dried out, which may be determined by the degree of humidity of the chamber and the moisture contained upon the surface of the product. This method of treatment, unlike hot air treatment, dries the product from the center outwardly leaving the surface only wet from the condensation within the heating chamber. This moisture upon the surface of the product may be allowed to evaporate naturally, or it may be evaporated artificially in an ordinary drying kiln or within the same heating chamber by the employment of dry heat. The temperature under which this drying is conducted also promotes rapid setting of the setting agent and causes a more thorough and complete coagulation of the albuminoid content of the product, making it harder and more resilient, as well as the destruction of ferment producing agencies, thereby thoroughly curing the product and rendering it sterile and proof against decomposition of the proteid constituent. Another important advantage gained by this drying treatment is that it liberates the terpenes and other volatile oils contained in the tiny cells of the wood, opening the cells for the thorough penetration of the wood by the binder and any water-proofing constituents employed and causing oxidation of the oils and a smooth blending of the oils, resins and binder, producing a degree of finer texture of the material and a thoroughly uniform distribution of the binder throughout the mass of the wood. The sum of the results of this drying treatment is the production of a cured product which is indurated or superhardened to a very high degree by maximum coagulation of its proteid constituent and oxidation of its resinous and oleaginous constituents, and which is therefore of finer grain or degree of homogeneousity, as well as tougher and more resilient, than the untreated product, there being an entire absence of looseness of texture or crumbly appearance, distinguishing in this respect from all prior wood products of this character as heretofore made.

My invention provides a wood product which is highly useful, among many other things, for the manufacture of floors, ceilings, beams, pillars, desk tops, panels and other parts of desks and other articles of furniture, boxes, fancy goods and articles, moldings, trunks, cases and cabinets, radio panels and the like, window, door and floor trim, refrigerators, insulation boards, croquet balls, balustrades, and boards and lumber of various kinds, as well as ornamental tiles or floor and wall slabs. It is superior to so-called ply wood, made of veneer sheets united by casein glue, in that it is stronger, tougher and more durable, more highly resistant and at the same time, unlike ply wood, is almost fire-proof, being non-combustible to a very high degree. Another advantage is that, as the binder is uniformly distributed throughout the material, there are no masses of glue present, in hardened or gummy state, to make the product difficult to work with tools. On the contrary, the product, while exceedingly hard, is of such texture that it may be worked with edge tools without causing the rapid dulling and excessive wear upon tools caused by casein-wood products or ply wood of ordinary construction. Furthermore, my improved product may be bored freely and easily, and nails and screws may be driven therethrough, without cracking or breaking of the product, and the product dried and cured in the manner described will not warp or check.

Having thus fully described my invention, I claim:—

1. A superhardened comminuted-wood and casein-binder product of the character described characterized in its freedom from fermentation producing agents liable to cause decay and in having the binder thereof supercoagulated and the oils and resinous constituents thereof blended and uniformly distributed throughout its mass, the said product consisting of a body resulting from a compressed mixture of comminuted wood, prepared casein glue and water from which the moisture has been driven from the center outwardly by applied moist heat of sufficiently high temperature to supercoagulate the albuminoids and cause diffusion of the oils and resinous constituents throughout the mass thereof and from which the residual amount of the expelled moisture has been dissipated by surface evaporation.

2. The process of making a composition of the character described, which consists in forming a body from a mixture of comminuted wood, water and casein glue, drying the body from the center outward by exposing it to the action of live steam at a temperature of from 300° to 400° F., so as to supercoagulate the casein and superharden the body and drive off the moisture to the surface, and then evaporating the surface moisture from the body.

3. The process of making a composition of the character described, which consists in forming a body from a mixture of comminuted wood, and prepared casein glue, consisting of powdered casein mixed with from 10 to 25% of powdered hydrated lime and sufficient water to produce a glue, drying the body from the center outward by exposing it to the action of live steam at a temperature of from 300° to 400° F., so as to supercoagulate the casein and superharden the body and drive off the moisture to the surface, and then evaporating the surface moisture from the body.

4. The process of making a composition of the character described, which consists in forming a body from a mixture of sawdust, 4 to 5 parts, prepared casein glue, 1 part, and water, 3 parts, drying the body from the center outward by exposing it to the action of live steam at a temperature of from 300° to 400° F., so as to supercoagulate the casein and superharden the body, and then evaporating the surface moisture from the body.

5. The process of making a product of the character described, which consists in preparing a composition of comminuted wood, casein glue and water, the water being in quantity slightly in excess of that required for saturation of the wood and agglutinization of the glue constituent, molding or otherwise shaping the material under pressure into a desired form so as to bring more or less of the excess moisture to the surface, subjecting the shaped material to the action of live steam at a temperature of from 300° to 400° F., so as to cause drying of the material from the center outward and produce maximum coagulation of the albumen content of the glue and oxidation of the oils and resins in the wood, and then evaporating the surface moisture from the material.

6. The process of making a composition of the character described, which consists in forming a body from a mixture of comminuted-wood, powdered casein, powdered hydrated lime and water, the water being in quantity slightly in excess of that required for saturation of the wood and agglutination of the casein constituent, molding or otherwise shaping the material under pressure into a desired form, subjecting the shaped material to the action of live steam at a temperature of from 300° to 400° F., so as to cause drying of the material from the center outward and produce maximum coagulation of the albumin content of the glue and diffusion and oxidation of the oils and resins in the wood, and then evaporating the surface moisture from the material.

7. As a new substance, a body formed from a mass of finely divided natural wood, and a casein binder holding the finely divided particles of wood in massed contact, said product resulting from a superhardening treatment under which the moisture is evaporated at predetermined temperatures successively from the interior and surface of the mass.

In testimony whereof I affix my signature.

WILLIAM W. CHRISTMAS.